W. M. WHITNEY.
PROCESS OF WELDING METAL.
APPLICATION FILED MAY 28, 1909.

986,528.

Patented Mar. 14, 1911.

Witnesses

Inventor
William M. Whitney
By Rufus B. Fowler
Attorney

UNITED STATES PATENT OFFICE.

WILLIAM M. WHITNEY, OF WINCHENDON, MASSACHUSETTS.

PROCESS OF WELDING METAL.

986,528.

Specification of Letters Patent.

Patented Mar. 14, 1911.

Application filed May 25, 1909. Serial No. 499,004.

*To all whom it may concern:*

Be it known that I, WILLIAM M. WHITNEY, a citizen of the United States, residing at Winchendon, in the county of Worcester and Commonwealth of Massachusetts, have invented a new and useful Improvement in Processes of Welding Metal, of which the following is a specification.

My invention relates to a process of welding metal in which the metals to be welded are of such different degrees of hardness that the amount of heat required to bring one to the welding heat would be sufficient to burn the other, thereby rendering it useless in the union. An example of the welding of metals possessing these characteristics is the union of steel possessing as one ingredient tungsten and wrought iron or steel. The welding of tungsten steel and wrought iron or steel has heretofore been regarded as impossible, because of the amount of heat necessary to melt the surface of the tungsten steel and bring it into condition for welding. The subjection of adjacent pieces of tungsten steel and wrought metal to the welding heat of the tungsten steel would burn up or consume the wrought metal. Such union is, however, desirable in the manufacture of cutting tools for wood and metal working machinery, in which the cutting edge is formed from the tungsten steel and the remainder of the tool is reinforced by a wrought metal on account of the extreme brittleness and cost of the tungsten steel.

My invention is, however, applicable to a welding of any two metals in which the temperature necessary to melt the surface of one will be sufficient to burn the other.

Figure 1:
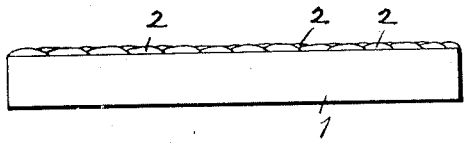
Figure 2:
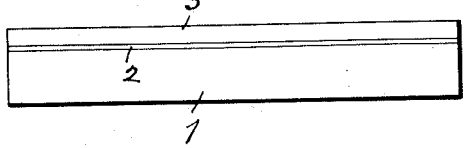

In the accompanying drawings forming a part of this specification Figure 1 represents a plate of hard material such, for example, as tungsten steel, having applied to its upper surface, when brought to a welding heat, a mass of fusible metal preparatory to the application of a softer plate by the process herein described, and Fig. 2 represents the completed product according to my present invention, consisting of plates of relatively hard and soft metal having their opposing surfaces united to an interposed layer of fused metal.

Similar reference letters and figures refer to similar parts in the different views.

In carrying out my improved process, I take a plate of hard metal 1, such as tungsten steel, which is to form one member of the completed tool or other product and, by means of a blow pipe or other suitable method of obtaining an intense heat on a limited area, I bring a small portion of the plate to a welding heat. I then apply to the heated surface a small quantity of melted metal, fusible at a lower degree of temperature than said heated metal. This may be conveniently accomplished by introducing into the flame of the blow pipe a piece of fusible wrought or cast metal, preferably a soft cast iron, or other material of a less degree of hardness than the heated metal. This fusible metal is held in the heat until it is melted and a portion of it has been deposited upon the heated surface of the hard metal as shown at 2, Fig. 1. As these two bits of metal are both at a welding point, the small drop of the softer metal is united to the heated area of the harder metal from which the heat of a blow pipe is removed before the softer metal is burned. This process is continued drop by drop until the entire surface of the plate of tungsten steel, or other hard metal, is covered with a series of individual pieces of the softer metal each welded to the heated plate. When this has been accomplished, the plate 3 of wrought iron or steel, which is designed to form the backing, is placed upon the surface of the softer metal such as cast iron applied in a fused state, as above described, and already securely united to the harder plate. The plates are then heated to the welding heat of the softer metal and the backing plate is united by compression to the metal which is already welded to the harder plate. The result is a combination of the particles of the intermediate fused metal 2 with the particles of the metal backing 3, and as the intermediate metal has already been combined with the particles of the harder plate, the wrought metal backing becomes firmly united thereto.

Any means of melting the softer metal which is to be applied to the harder plate may be employed, the only essential being that it be applied to the harder plate in a melted condition and in small quantities upon the restricted area of the harder plate which has been heated to the welding point. In some cases where the harder plate is very thin, the intense heat of the blow pipe would tend to distort the plate as it is heated. To prevent this distortion, I preferably make the plate in such cases thicker and narrower than its final shape and, after the melted softer metal has been applied, I compress, by rolling or otherwise, the plate to its final form. This also levels the surface of the softer fused metal, which is left uneven and of varying thickness as a result of its application in small quantities. As the softer metal is applied to the harder plate in a fused condition, the particles are granular and do not furnish the additional strength which is the object of the welding thereto of the softer but tougher metal. The requisite toughness is obtained by the addition of the plate of softer metal which is not melted, but is brought merely to the welding point. The metal 2 applied in a melted condition directly to the heated surface of the harder plate 1 acts merely as a bond of union between the harder plate 1 and the softer metal backing 3.

The principle of operation is to so arrange the heating of the harder steel and the softer metal that, while the harder plate is brought up to its welding temperature, the softer metal shall not be heated beyond its melting temperature. The heated harder metal and the fused softer metal are thus brought together and their particles allowed to commingle, without injuring the softer metal by the intense heat required to bring the harder metal to the welding point. A further addition of wrought metal to give the required toughness is now possible owing to the thin coating of soft metal which is now integral with the plate of harder metal.

When a blow pipe is used to impart the necessary heat to bring the harder plate to the welding point, the softer metal to be melted is introduced into the flame of the blow pipe at the proper time to cause the melting of the softer metal simultaneously with the arrival at the welding heat of the harder metal.

The union between the melted metal and the plate of harder metal may be produced without compression, but when the plate of softer metal is applied to the surface of the metal which has been fused, pressure is applied as in the ordinary process of welding.

In the above description of my process, I have used the terms "hardness" and "softness" with reference to the comparative fusibility of the metals treated; the metal fusible at a high degree of heat being considered as a hard metal, and that fusible at a lesser degree of heat as a softer metal.

I claim,

1. A process of welding metals of such different degrees of hardness that the heat required to melt one would be sufficient to burn the other, comprising covering the surface of the harder metal, heated to a welding point, with melted metal fusible at a lower temperature than said harder metal and welding a plate of softer metal to the surface so prepared.

2. A process of welding metals of such different degrees of hardness that the heat required to melt one would be sufficient to burn the other, comprising heating restricted areas of the surface of the harder metal to a welding point, applying to each heated area a limited quantity of melted metal fusible at a lower temperature than said harder metal, heating said prepared surface to a welding point and welding thereto a heated plate of said softer metal.

3. A process of welding metal in order to apply to a hard and brittle metal a soft but tougher metal as a backing, comprising heating in succession limited areas of the surface of a plate of brittle metal to the welding point, applying to each area as it is heated melted metal having a melting point at a lower temperature than said brittle metal and welding to said surface a plate of softer material than said brittle plate.

4. A process of welding metals of such different degrees of hardness that the heat required to melt one would be sufficient to burn the other, comprising covering the surface of the harder metal, heated to a welding point, with a thin coating of melted metal fusible at a lower temperature than said harder metal, heating a plate of softer metal to the welding point and uniting the surfaces of said softer metals by compression.

5. A process of welding metals of such different degrees of hardness that the heat required to melt one would be sufficient to burn the other, comprising heating the surface of said harder metal to a welding point, uniting with the particles of said surface melted metal fusible at a lower degree of temperature than said hard metal, and uniting with the particles of said melted metal the surface of a softer metal heated to a welding point.

WILLIAM M. WHITNEY.

Witnesses:
PENELOPE COMBERBACH,
ROY D. TOLMAN.